(12) United States Patent
Pereira et al.

(10) Patent No.: US 10,401,530 B2
(45) Date of Patent: Sep. 3, 2019

(54) METHOD AND SYSTEM FOR QUALITY CONTROL IN GAMMA-GAMMA DATA DURING MINERAL EXPLORATION

(71) Applicant: VALE S.A., Rio de Janeiro (BR)

(72) Inventors: Wanderson Roberto Pereira, Belo Horizonte (BR); Dionisio Uendro Carlos, Belo Horizonte (BR)

(73) Assignee: VALE S.A., Rio de Janeiro (BR)

( * ) Notice: Subject to any disclaimer, the term of this patent is extended or adjusted under 35 U.S.C. 154(b) by 588 days.

(21) Appl. No.: 14/701,180

(22) Filed: Apr. 30, 2015

(65) Prior Publication Data

US 2015/0316678 A1  Nov. 5, 2015

Related U.S. Application Data

(60) Provisional application No. 61/988,810, filed on May 5, 2014.

(51) Int. Cl.
*G01V 5/12* (2006.01)
*G01V 5/04* (2006.01)

(52) U.S. Cl.
CPC .............. *G01V 5/12* (2013.01); *G01V 5/045* (2013.01); *G01V 5/125* (2013.01)

(58) Field of Classification Search
CPC ..................................................... G01V 5/125
See application file for complete search history.

(56) References Cited

U.S. PATENT DOCUMENTS

| | | |
|---|---|---|
| 2,686,881 A | 8/1954 | Gerhard |
| 3,038,075 A | 6/1962 | Youmans |
| 3,233,105 A | 2/1966 | Youmans |
| 3,281,599 A | 10/1966 | Baker et al. |
| 3,292,904 A | 12/1966 | Willis |
| 3,380,714 A | 4/1968 | Leonard |
| 3,538,329 A | 11/1970 | Niven, Jr. |
| 3,617,746 A | 11/1971 | Janssen et al. |
| 3,654,470 A | 4/1972 | Wilson |
| 3,693,029 A | 9/1972 | Niven, Jr. |
| 3,701,902 A | 10/1972 | Janssen et al. |
| 3,860,816 A | 1/1975 | Wilson |
| 4,034,218 A | 7/1977 | Turcotte |
| 4,048,495 A | 9/1977 | Ellis |
| 4,297,575 A | 10/1981 | Smith et al. |
| 4,527,058 A | 7/1985 | Smith, Jr. |
| 4,618,765 A | 10/1986 | Sonne |

(Continued)

*Primary Examiner* — Yu-Hsi D Sun

(74) *Attorney, Agent, or Firm* — Arent Fox LLP

(57) ABSTRACT

A method for quality control of gamma-gamma well logging data within a borehole for mineral exploration, including receiving, at a computing device, raw well logging data; identifying and formatting data sets from the raw well logging data; applying at least one quality control process to the formatted data sets, the at least one quality control process being selected from: a linear verification process comparing linearity of density data readings between a long and a short spaced sensor in a probe; a density range verification process comparing density readings at the probe with density ranges for the borehole lithology; a diameter comparison process comparing actual diameter of the borehole at a depth with density readings at the depth; and a residual verification process for verifying a proportionality between densities measured by the long spaced sensor and short spaced sensor; compiling the results and providing an output of the compiled results.

22 Claims, 16 Drawing Sheets

(56) References Cited

U.S. PATENT DOCUMENTS

| | | |
|---|---|---|
| 4,638,158 A | 1/1987 | Sonne et al. |
| 4,701,868 A | 10/1987 | Regimand |
| 4,814,611 A | 3/1989 | Moake |
| 5,377,105 A | 12/1994 | Smith |
| 5,390,115 A | 2/1995 | Case et al. |
| 5,525,797 A | 6/1996 | Moake |
| 5,530,243 A | 6/1996 | Mathis |
| 5,627,368 A | 5/1997 | Moake |
| 5,659,169 A | 8/1997 | Mickael et al. |
| 5,910,654 A | 6/1999 | Becker et al. |
| 2002/0008197 A1 | 1/2002 | Mickael |
| 2002/0190198 A1 | 12/2002 | Mickael |
| 2005/0234649 A1 | 10/2005 | Calvert et al. |
| 2005/0263692 A1 | 12/2005 | Samworth |
| 2010/0252725 A1 | 10/2010 | Stewart |
| 2011/0253364 A1 | 10/2011 | Mosse et al. |
| 2011/0307179 A1 | 12/2011 | Zhou |
| 2012/0143507 A1 | 6/2012 | Harding et al. |
| 2012/0170405 A1 | 7/2012 | Zharnikov et al. |
| 2013/0066557 A1 | 3/2013 | Forgang |
| 2013/0066560 A1 | 3/2013 | Dyatlov et al. |
| 2013/0261974 A1 | 10/2013 | Stewart et al. |
| 2015/0039232 A1 | 2/2015 | Samworth |
| 2015/0316681 A1 | 11/2015 | Pereira et al. |

METHOD AND SYSTEM FOR QUALITY CONTROL IN GAMMA-GAMMA DATA DURING MINERAL EXPLORATION

CROSS-REFERENCE TO RELATED APPLICATIONS

This application is based upon and claims the benefit of priority to U.S. Provisional Application No. 61/988,810, filed May 5, 2014. The disclosure of the prior application of which is hereby incorporated in its entirety by reference.

FIELD OF THE DISCLOSURE

The present disclosure relates to gamma-gamma geophysical well logging, and in particular relates to quality control of gamma-gamma geophysical well logging data.

BACKGROUND

Mineral formations, such as iron ore formations, commonly present high values of density contrasts with respect to the hosting environment. In this context, rock density is a key parameter in the estimation of resources and reserves that contribute to geological modeling activities for the purposes of mineral exploration.

With respect to conventional techniques for determining the density of rocks, gamma-gamma geophysical well logging is one technique which provides for methods for direct measurements of density in drilling cores or samples. In gamma-gamma geophysical well logging, density measurements are performed inside the borehole, also referred to as in-situ. The record of these density measurements is acquired at a centimeters pace, ensuring ore volume is not overestimated.

However, gamma-gamma geophysical well logging applied to the exploration of minerals presents some peculiarities. These peculiarities are due to the ambiguity of density readings between different rock types, both iron formations and surrounding rocks and igneous intrusions, and the direct relation between the measurement quality conditioned by the characteristics of the rock mass. Specifically, the rock mass may be loose or compact, of more or less homogeneous composition, and include structural features throughout the borehole or mechanically induced stress caused by the geological drilling activity.

Thus, for gamma-gamma well logging data to be used systematically, the ability is needed to distinguish sections with good signal recovery from those whose measure is affected by operational and geological conditions.

BRIEF DESCRIPTION OF THE DRAWINGS

The present disclosure will be better understood with reference to the drawings, in which.

DETAILED DESCRIPTION OF THE DRAWINGS

The present disclosure provides a method, at a computing device, for quality control of gamma-gamma well logging data within a borehole for mineral exploration, the method comprising: receiving, at the computing device, raw well logging data; identifying and formatting data sets from the raw well logging data; applying at least one quality control process to the formatted data sets, the at least one quality control process being selected from: a linear verification process comparing linearity of density data readings between a long spaced sensor and a short spaced sensor in a gamma-gamma well logging probe; a density range verification process comparing density readings at the gamma-gamma well logging probe with density ranges for the borehole lithology; a diameter comparison process comparing actual diameter of the borehole at a depth with density readings at the depth; and a residual verification process for verifying a proportionality between densities measured by the long spaced sensor and short spaced sensor; compiling the results of the at least one quality control process; and providing an output of the compiled results.

The present disclosure is described with regard to the discovery of iron formation, commonly present in high values of density contrast with respect to the hosting environment. However, the present disclosure is not limited to iron ore exploration and the systems and methods described herein can equally be used for other types of exploration, including other minerals such as copper and nickel, as well as other materials such as coal. These are merely examples and the present disclosure can also be used with other types of exploration.

With regard to well logging data, the present disclosure provides for the use of one or more quality control techniques in order to improve the quality of the well logging data. Such quality control techniques include linearity verification between different spaced gamma-gamma sensors; verification of the recorded densities range; comparison between the internal diameters of the borehole walls and the nominal drilling diameter; and verification of the proportionality between the densities measured by the sensors of the short and long spacing in the probe by means of residual analysis. Each is described below.

Determination of Densities by Geophysical Methods of Gamma-Gamma Well Logging

Gamma-gamma well logging is based on the interaction of gamma radiation with matter. Specifically, gamma-gamma well logging deals with the manner in which a particular material is traversed by a gamma ray beam. The gamma ray beam may be provided in an energy range that promotes Compton scattering, or approximately 600 keV.

In this regard, a radioactive source of known activity, such as caesium-137, may be applied, emitting gamma radiation. A set of sensors positioned under a controlled geometry may accumulate gamma particles that traverse the material studied.

Figure 1:
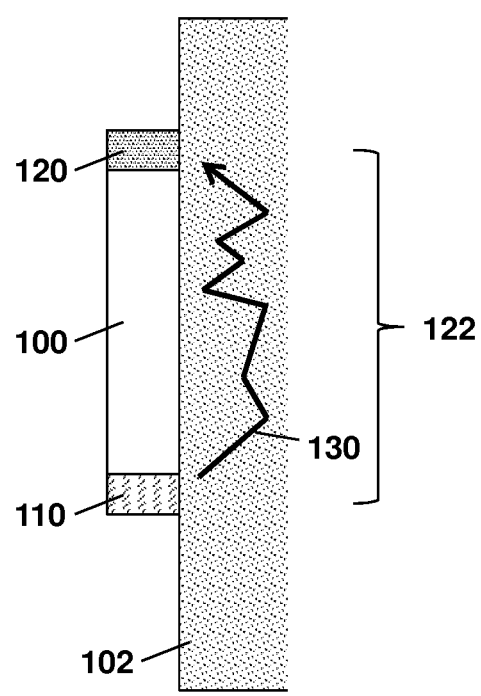
FIG. 1 is a schematic view of a simplified tool for gamma-gamma well logging.

Reference is now made to FIG. 1. In the example of FIG. 1, a well logging tool 100 is placed in proximity to a material to be studied 102. For example, the material 102 may be a rock formation inside a borehole.

Tool 100 includes a gamma source 110 and at least one gamma radiation sensor 120, which are a known distance apart, shown by reference 122.

Gamma source 110 provides a gamma ray beam which proceeds into material 102. Some of the gamma ray beams will deflect and be detected by sensor 120, as shown by beam 130.

In particular, due to the interaction between gamma particles and the geological material 102, the counting observed by the sensor 120 is attenuated with respect to the counting observed directly from the radioactive source, and the counting is then associated with the density of the geological material in accordance with equation 1 below.

$$N = N_0 e^{-\mu \rho X} \quad (1)$$

In equation 1 above, N is the counting detected on the sensor, $N_0$ is the direct counting emitted from the source, $\mu$ is the mass absorption coefficient, p is the material density, and x is the source-sensor distance. Thus from equation 1, as $\mu$, x and $N_0$ are known, the density can be calculated based on the count N received at the sensor.

Knowing the parameters involved in equation 1, it is therefore possible to relate the density values in the material 102 with the values of gamma particle counting at sensor 120.

Well Logging Operations

In operation, gamma-gamma well logging includes introducing a well logging probe into a borehole. The tool is equipped with a radioactive source and, in practice, at least two receiver sensors for reading the counting per second (CPS) of incident gamma particles. The two sensors have different but known spacing from the source. The two sensors are used for the determination of rock contacts influenced by proximity of such contacts to each sensor.

Figure 2:
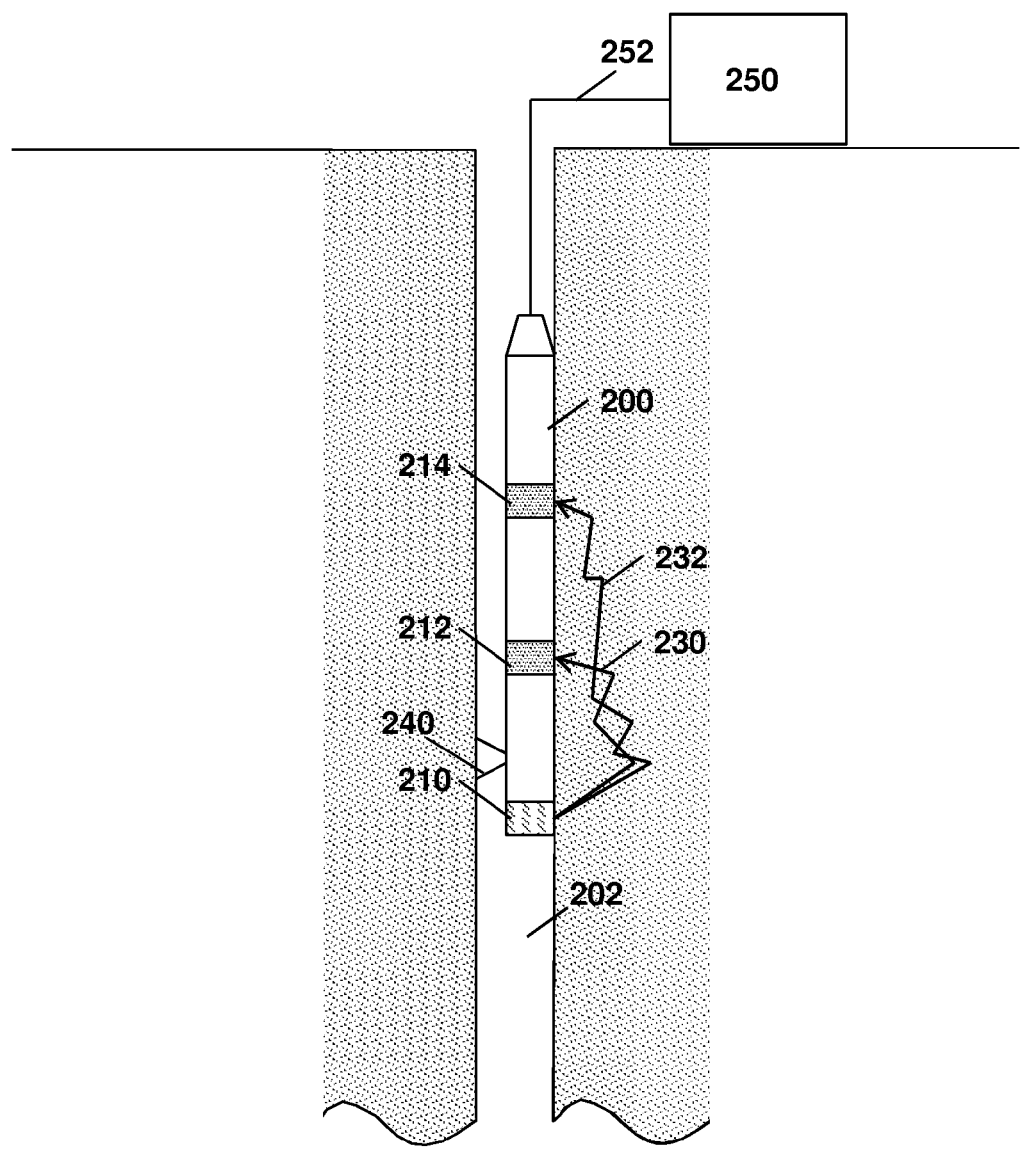
FIG. 2 is a schematic view of a further simplified tool for gamma-gamma well logging.

In particular, reference is now made to FIG. 2, which shows an example of a probe 200 that may be lowered into a borehole 202. Probe 200 includes a gamma radiation source 210 which has known properties. For example, in one embodiment the source may be cesium-137.

Probe 200, in the example of FIG. 2, includes two sensors, namely short sensor 212 and long sensor 214. The spacing between source 210 and short sensor 212 and long sensor 214 is predetermined and known. However, in other embodiments more than two sensors may be used on a probe 200. Sensors 212 and 214 may be any suitable sensor which can detect the gamma ray beams from source 210 and provide an accurate count.

Source 210 emits gamma ray beams as shown by, for example, gamma ray beams 230 and 232. The various gamma ray beams may be detected, after scattering within the material surrounding borehole 202, by either short sensor 212 or long sensor 214.

In some embodiments, probe 200 may include a caliper 240 to determine the diameter of the hole. As will be appreciated by those in the art, the hole diameter may vary based on factors such as friable material becoming loose or due to compression reducing the diameter of the hole. Such caliper 240 may further force probe 200 into contact with a wall of borehole 202.

In one embodiment, data from probe 200 is provided to the surface to a data receiver 250 utilizing a communications cable 252. However, other options are possible, including the storing of data on the probe 200 during operation and transferring such data to a computer for processing at a later time. Further, in some embodiments probe 200 may include some processing or pre-processing capabilities to allow for the quality control filtering or identification on the probe itself. However, the examples below use a surface data receiver 250 for illustration.

Data receiver 250 may be a computer with the capability of conditioning the data in accordance with the techniques described below. In other embodiments, data receiver 250 may merely record the data for processing at a later time in accordance with the methods described below. In the second option, a further computer (not shown) may perform computation on the data provided by probe 200.

In operation, probe 200 may be lowered into a borehole and data readings may be captured as the tool is raised. The depth of the probe would be known generally based on the tool lowering mechanism, and may further be calibrated based on naturally occurring radiation as described below. The rate of ascension of the probe may be set to assure quality readings of the material surrounding borehole 202.

Further, due to the nature of the operation and associated environmental constraints, such as the instability of the borehole walls, some care may be taken in geophysical well logging intended for mineral exploration, especially when the use of the gamma-gamma tool is involved. In particular, in situations with an open hole where the hole does not have any casing, collapsing of the walls is possible, particularly when the borehole crosses ranges of friable rock. To avoid accidents with a radioactive source, in one embodiment, before running the gamma-gamma probe 200, the borehole conditions may be verified using a caliper tool that measures the variation in the internal diameter along the hole. Further, such caliper tool may also be equipped with a gamma ray sensor to detect naturally occurring gamma radiation.

In the case of rocks with predominance of friable material, or with a history of collapse, in one embodiment an inert tool may be run without any radioactive source or measurement sensors. Such procedure enhances the probability that the tool with the radioactive source will be successfully run and avoids the loss of the well logging tool with the radioactive sourcing case of borehole collapse. As will be appreciated, the loss of such tool may be hazardous to future mining operations as well as costly for replacement of such tool.

Data Analysis

The radiation intensity measured for a gamma ray source varies with the distance from the source. In this regard, a first control in gamma-gamma density measurement is the distance between the source and the target. In other words, the first control is the distance between the source and the borehole wall.

A second control for data analysis in gamma-gamma well logging data acquisition is the sensor position with respect to the radioactive source, as well as a reference located at the top of the hole. This information may be used to establish a reference for controlling the depth of each measure over the hole.

The gamma-gamma well logging information throughout the depth of the borehole, as well as associated data such as hole temperature and diameter, may be arranged so that the relative positions of such information are well defined. This may, for example, be done by using natural gamma radiation.

For example, in one embodiment a natural gamma tool may be attached to other tools in order to provide for a non-variable characteristic of the natural radioactivity counting differences of the different geological materials in the borehole. Such natural radioactivity counting may then be used to calibrate the position of the various measurements made by different well logging tools.

Figure 3:
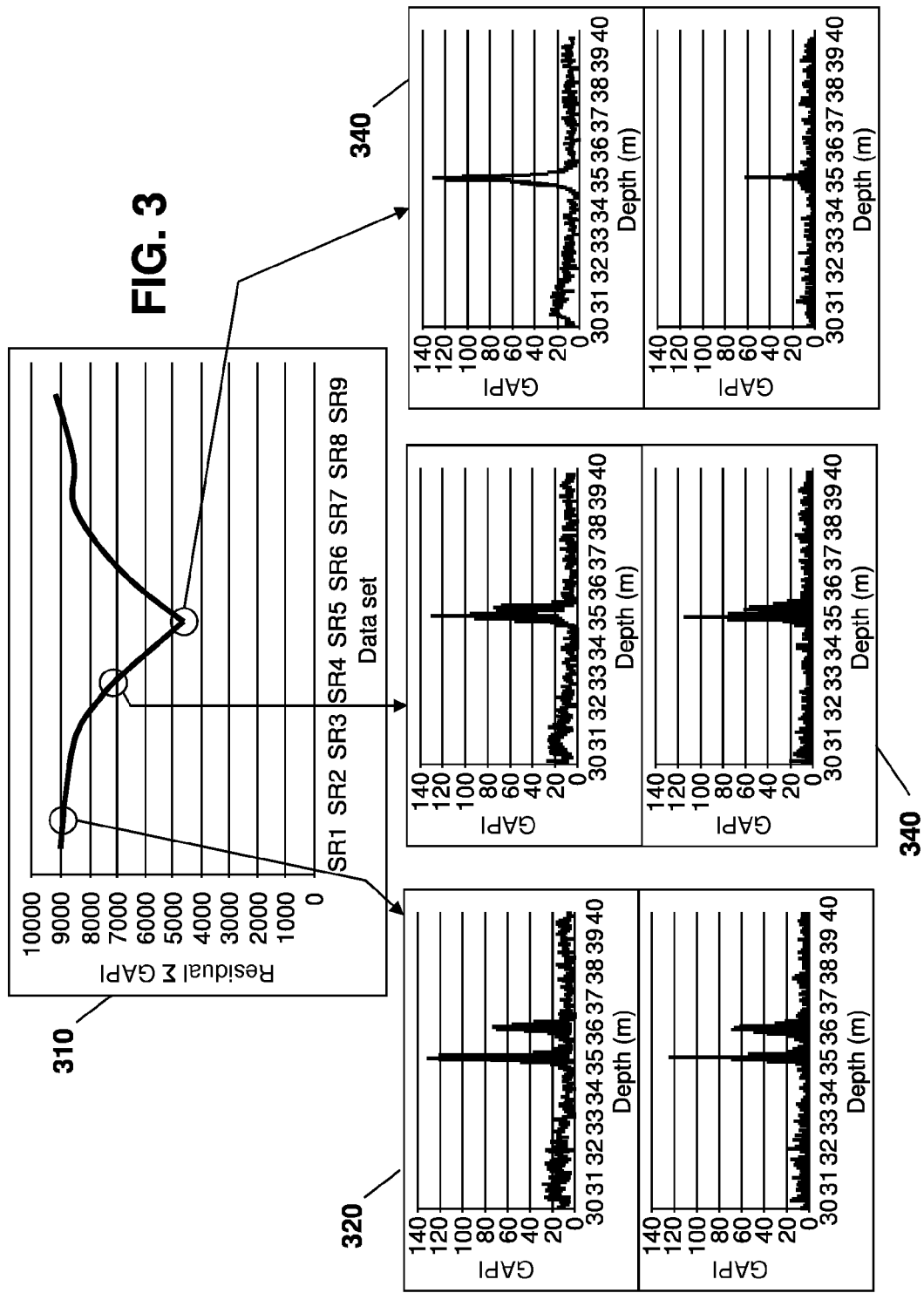
FIG. 3 is a plot of varying concordance of depth data between two tools utilizing naturally occurring gamma counts.

Specifically, given a set of natural gamma data for two different tools in the same borehole, a depth adjustment may be made based on the overlap of the profiles (logs) around outstanding features such as a local peak count. Reference is now made to FIG. 3.

FIG. 3 provides natural gamma count overlapping for two different tools in the same borehole. In particular, as seen in FIG. 3, plot 310 shows the residual sum of the gamma American Petroleum Institute (API) units when compared with various data sets.

Various points are selected along the plot and the overlap is provided in graphs 320, 330 and 340.

As seen at graph 320, the upper plot shows the overlapping of natural gamma ray data between the two tools, and the lower plot shows the overlapping of residual data. As seen by graph 320, a position of lower concordance exists between two different tools and in this regard, two spikes are seen.

Referring to graph 330, two plots are shown, namely an overlapping natural gamma ray data in the upper plot and the overlapping residual data in the lower plot between two tools. In this case, the position selected provides medium concordance between the tools, where two spikes, although close together, are still seen.

A third position in the plot of 310 provides for the graph 340. In graph 340, the upper plot again shows the overlapping of the natural gamma ray data and the lower plot shows the overlapping of the residual data between two tools. As seen by graph 340, a high concordance is achieved between the two tools in the same borehole.

The above therefore allows for the selection of location data to a point at the top of the hole.

A further parameter that may need to be considered is the presence of water in the hole. Interstitial water can cause interference in density values. To detect the presence of water, a temperature sensor may be used to indicate the water level in the hole, and, in a processing phase, correction factors may be introduced to compensate for the effect of the presence of water.

Taking the above into account, for the analysis of gamma-gamma well logging data, a set of information may be contained in the logging profiles. Such information includes the natural radioactivity of the rocks obtained from a natural gamma tool, the density of the rock obtained from the gamma-gamma well logging, the temperature obtained through a temperature sensor and variations in hole wall diameter measured by a caliper tool.

Figure 4:
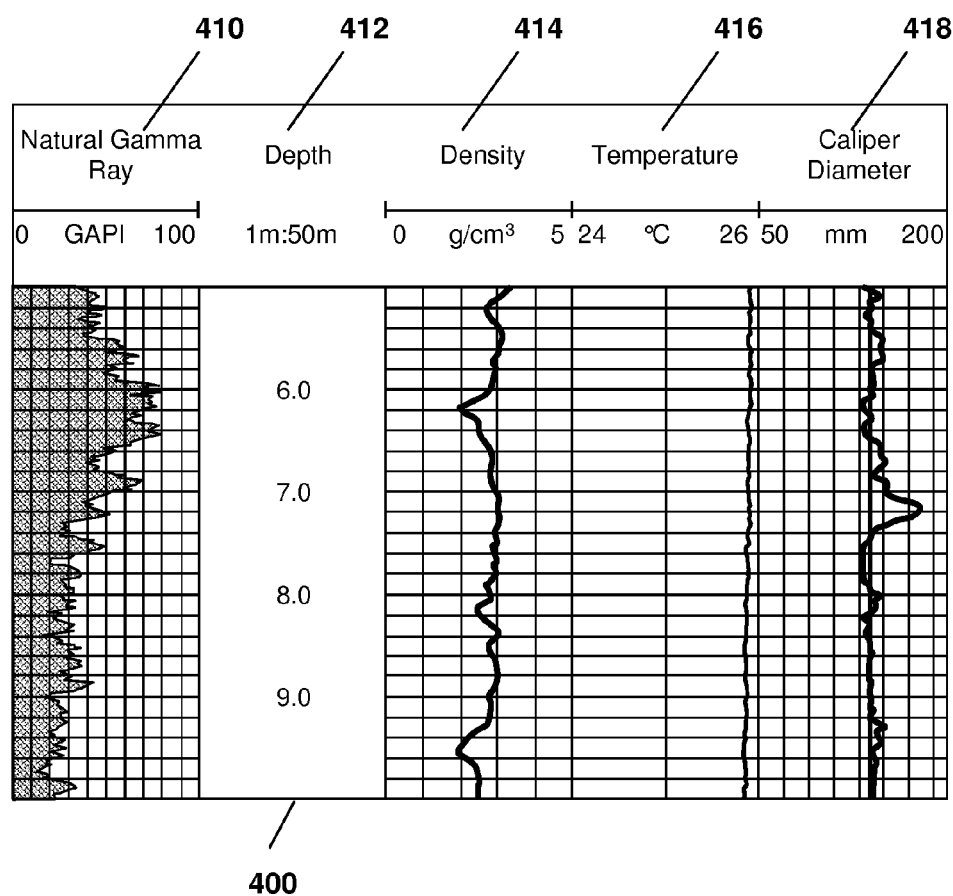
FIG. 4 is a plot of a gamma-gamma well logging log with various datasets.

Reference is now made to FIG. 4 which shows an example of gamma-gamma log data 400. In the example of FIG. 4, natural gamma ray data is shown by plot 410, the depth at which the measurement is made is shown at plot 412, the density data is provided with plot 414, the temperature of the probe is shown with regard to plot 416 and caliper data is provided with regard to plot 418. Further, plot 418 also shows the nominal diameter of the borehole as a solid line.

Thus, the gamma-gamma logging data 400 allows the density from plot 414 to be compared with temperature, caliper diameters and natural gamma ray counts in order to calibrate the density data.

The log 400 may be presented with appropriate depth adjustments based on natural gamma readings, as described above with regards to FIG. 3.

Further, as described below, quality control may be provided over log 400 to ensure quality of the density measurements in plot 414.

Quality Control

In the description below, four measures of quality control are provided for gamma-gamma logging data. While all four may be used together in some embodiments, in other embodiments only a subset of the quality control measures may be required for particular applications. Thus, while all four are described for use in one system, the present disclosure is not so limited and in other embodiments only a subset of the quality controls described below may be utilized.

Linearity in Density Readings

As indicated above with regard to FIG. 2, a probe 200 includes at least two sensors, namely a short sensor 212 and a long sensor 214. A first aspect of quality control may therefore be the verification of linearity in the density readings between the two sensors.

Figure 5:
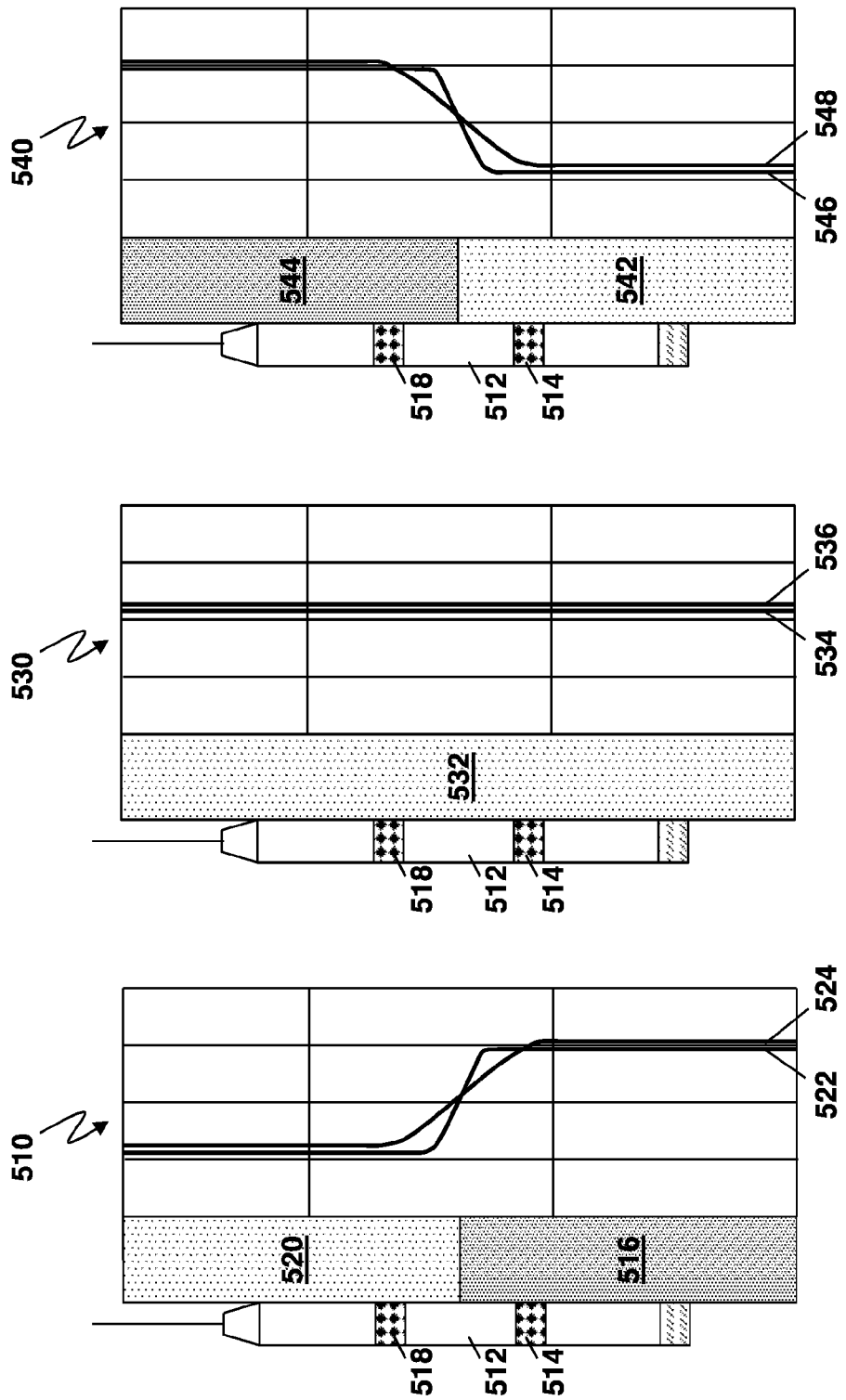
FIG. 5 shows a series of plots of densities recorded by a long sensor and short sensor during a transition from a dense to less dense lithology, a homogenous lithology, and a transition from a less dense to a more dense lithology.

For a range of continuous and homogeneous lithology, with no significant structural or compositional variations such as discontinuities in rock mass and rock faulting, it is expected that both sensors will read the same density. Such uniformity does not occur in rock contacts where a layer influences one of the sensors more than the other. Reference is now made to FIG. 5.

As seen in FIG. 5, plot 510 shows the example where a probe 512 has a short sensor 514 in proximity to a more dense rock area or layer 516 and the long sensor 518 is in proximity to a lower density rock area or layer 520.

Two density curves as measured by the sensors are provided. Specifically, curve 522 shows the density measurements are recorded by the short sensor 514. Curve 524 shows the density measurements are recorded by the long sensor 518.

As shown by plot 510, the transition from the low density to the high density rock in curve 522 is sharper than that of curve 524. In particular, curve 524 has a less steep transition between the low density area 520 and the high density area 516.

Based on plot 510, it can be seen that as the probe crosses the transition area the two plots 522 and 524 are not linear with respect to each other.

Conversely, above the transition and below the transition the two curves 522 and 524 are linear.

In plot 530 of FIG. 5 a homogenous region 532 is covered by probe 512. Plot 530 includes curve 534 for short sensor 514 and curve 536 for long sensor 518. As region 532 in homogenous, curves 534 and 536 are linear.

With regard to plot 540 of FIG. 5, this plot shows the transition from a high density area 544 to a low density rock 542. In this case, curve 546 shows the density as recorded by the short sensor 514 and curve 548 shows the density as recorded by long sensor 518. As seen in plot 540, at the transition point, curve 546 is steeper than curve 548 and the two curves are not linear in this area with respect to each other. Above and below the transition curves 546 and 548 are linear.

From FIG. 5, one may consider for a sharp contact between lithologies that the transition between the density values corresponding to each lithology, observed in the short spaced sensor is more significant than that found in the long spaced sensor. That is, for the short sensor the transition is sharper while for the long sensor the transition is smooth.

Figure 6:
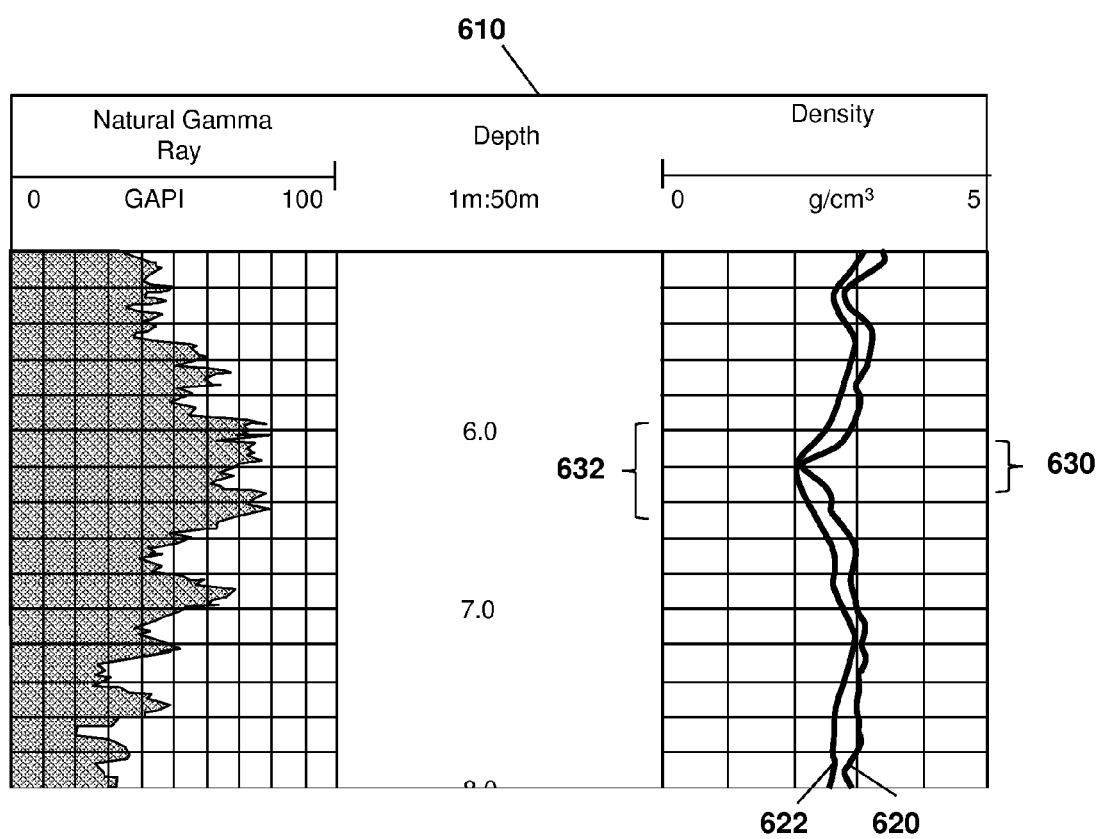
FIG. 6 is a plot showing density readings between a long and short sensor in a transition zone.

The behavior of FIG. 5 may be verified experimentally both in the transition to a denser lithology as to a less dense lithology through the density readings around a point of convergence. Specifically, a thin layer of discordant density with respect to the adjacent densities for which both the sensor readings converge allows observation, for each sensor, of a transition of input and output. Reference is now made to FIG. 6.

As seen in FIG. 6, plot 610 shows, at a depth between 6.0 meters and 6.5 meters, an increase in the natural gamma values to a value near 80 API.

Further, the density values as read by short sensor, shown with curve 620 and the density values read by long sensor, shown by curve 622, decrease in this range.

The convergence range for the short sensor, as shown by reference 630, is smaller than the convergent range for the long sensor, as shown by reference numeral 632. These areas show a convergence of input and output of the long space and short space sensors.

In lithological contact zones, specifically in ranges in the hole where contact occurs or transition between lithologies occurs, the tool may be positioned such that a sensor is in contact with a lithology and the other sensor is in contact with another lithology. In this case, a sensor records the density of a lithology and the other records a density composition thickness of both lithologies. Abnormal ranges of spacing less than the spacing between the sensors are recorded only by one of the sensors. This is, for example, shown with regard to FIG. 7.

Figure 7:
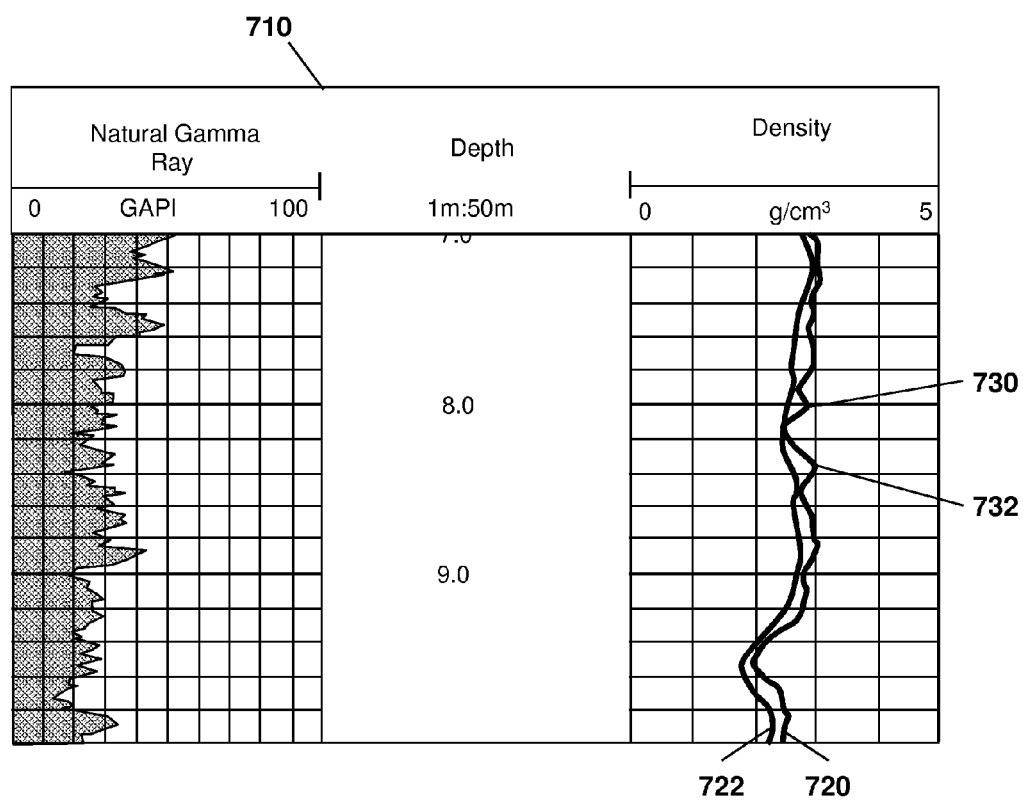
FIG. 7 is a plot showing density readings of a long and short sensor in which the short sensor shows anomalous occurrence of the magnitude of the spacing between the sensors.

In particular, as seen in plot 710 of FIG. 7, the density recorded by the short spaced sensor is shown by curve 720 and that of the long spaced sensor is shown by curve 722.

At points 730 and 732 on curve 720, abnormal ranges of spacing less than the spacing between the sensors are recorded only at the short range sensor. While it is expected that there is consistency between the density values obtained by the two sensors, thickness variations of a magnitude less than the spacing between the sensors causes linearity issues.

Thus FIG. 7 shows that between 8 meters and 8.5 meters the long spacing sensor does not record the features indicated by reference numerals 730 and 732 recorded by the short sensor. However, for the range between 7 meters and 10 meters, in general the curves converge.

Figure 8:
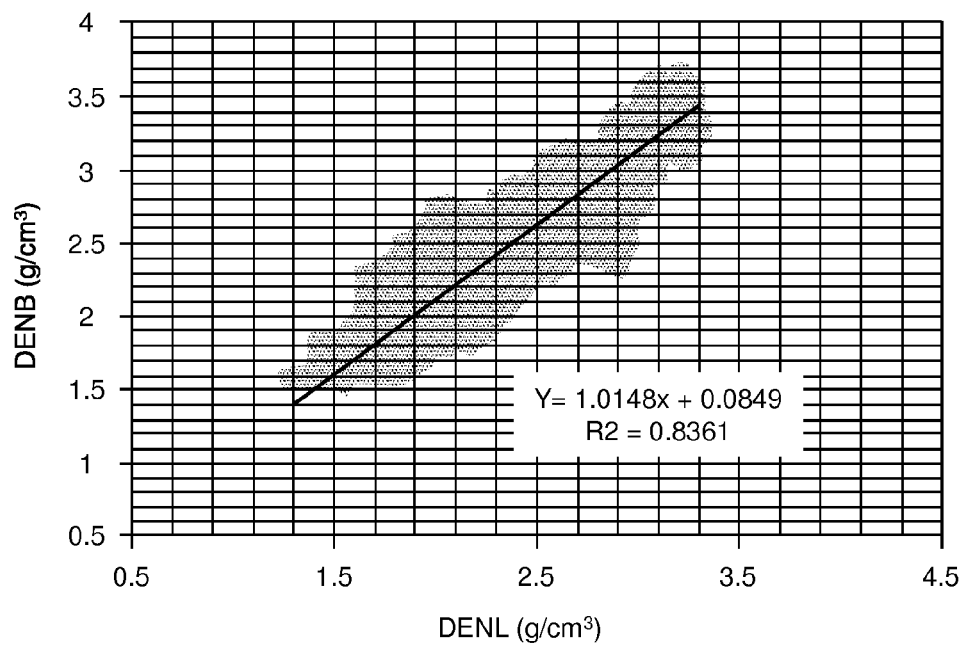
FIG. 8 is a graph showing a linear relationship between the readings of the long and short sensors.

Thus, a first check of gamma-gamma well logging data quality may be a study of the linearity between the measurements of the different sensors. A linear correlation between the sensors, as shown by the plot of FIG. 8, can be expected for the entire data set. Thus, the density measured by the long spaced sensor presents a linear correlation with the short spaced sensor.

The example of FIG. 8 shows the behavior of measurements obtained by differently spaced gamma sensors of the same probe, showing the linear relation between them. In the example of FIG. 8, $R^2$ is equal to 0.8 for a $y=ax+b$ relation, where a is approximately equal to 1 and b is approximately equal to 0.

Verification of linearity can be used to detect significant problems on the wall of the borehole or problems in one of the sensors, as detected by the loss of linearity between the sensors.

Verification of the Recorded Densities Range

From the above, the linearity between the sensors may be checked. However, the linearity may be checked even if there is no geological consistency in the measurements. Specifically, both short and long spaced sensors may present measurements that, although correlated, diverge from the values expected to the geological context in which they are in. This may be due to problems in tool communication, such as electronic data registry problems, as well as operational factors such as inadequate control of the ascent rate. In either case, the range of density values obtained by the sensors may be checked throughout the length of the hole, which may require a time proportional to the depth of the boreholes, considering an ascent rate of, for example, one meter per minute.

One way to optimize the linearity check is to establish maximum and minimum densities, using a computational routine that reads data from a hole and compares densities of this record with density limits established as expected for the geological context. The computational routine may automatically delete data that is not between the limit values established. The verification can then be confirmed by viewing a set of density data, as for example, shown by FIG. 9.

Figure 9:
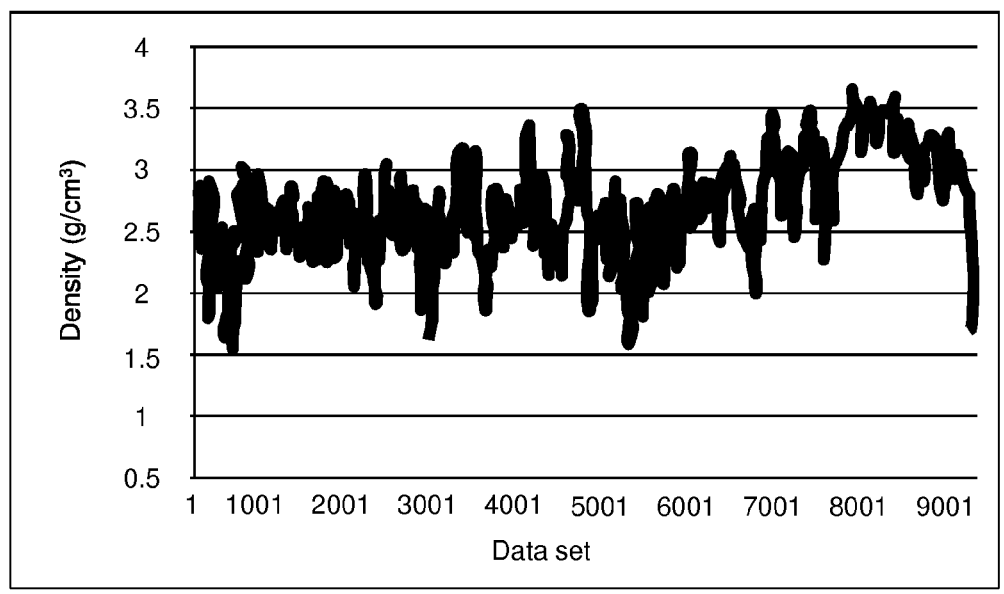
FIG. 9 is a plot of the densities read for various depths to determine an accurate density range.

In particular, FIG. 9 shows a density for various data sets which range in the value of approximately 3.6 as the highest density to 1.5 as the lowest density.

Thus a second check for quality data from gamma-gamma well logging involves the use of a densities range check of a hole made at ranges. In this case, the analysis and eventual exclusion of range data does not discard all of the data within the hole, but rather only discards a portion of the data as long as there is consistency and valid ranges on the geological point of view. Such check may be done on a computer such as data collection computer 250 from FIG. 2. Data that falls outside of a threshold for recorded range densities can be excluded. For example, a computer program could analyze data for the depth of a borehole and remove data that does not fall within the threshold range. The ranges may be determined based on known density of the rock surrounding the borehole.

Comparison Between the Internal Diameters of the Borehole Walls and the Nominal Drilling Diameter Even with the overlapping controls of linearity and range of densities, there may be ranges that, while complying with the requirements of the first and second check, may still not be valid for the interpretation of densities for presenting variations caused by mechanical factors related to the conditions of the borehole, such as collapses.

To provide for the validity of density ranges, a third quality control may use a variation in the hole diameter, measured by a caliper tool, to verify compliance with the requirements of distance between the source and the target for which there must be contact between the rock and the sensor. Thus, a caliper tool may identify ranges whose borehole conditions may influence the density values.

Density values with intermittent or continuous variation may relate to geological factors and composition and texture of the rock. Further, density values with such variation may relate to natural mechanical factors such as faults or fractures, or further relate to induced mechanical factors such as fracturing caused by drilling activity. The various factors can be distinguished by comparing the density variation to a caliper curve.

Figure 10:
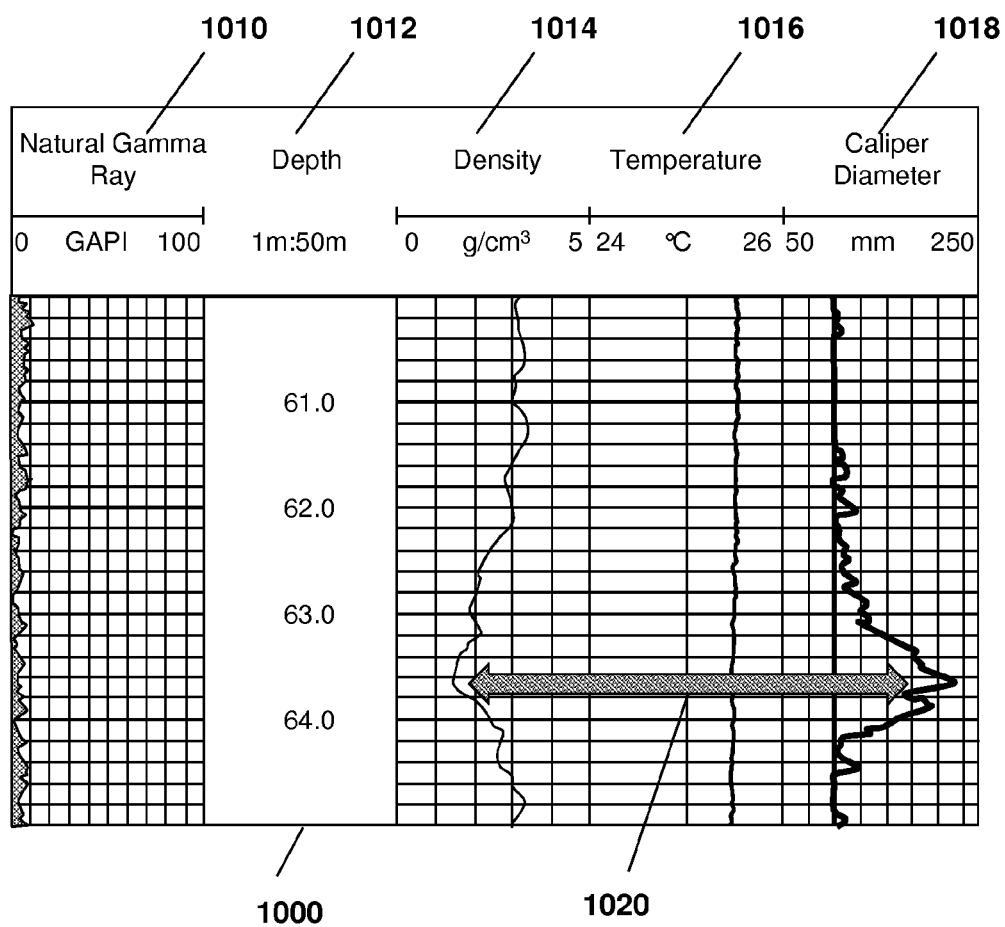
FIG. 10 is a graph showing changes in density in relation to a steady natural gamma count but in a borehole whose measured diameter is larger than a nominal diameter.

In accordance with one embodiment of the present disclosure, a procedure is provided which involves observing whether the variation in the density profile has a correspondence with any variation in the borehole wall. When such correspondence occurs, the variation of density may be attributed to the conditions verified on the borehole wall. Reference is now made to FIG. 10.

In FIG. 10, a graph 1000 includes a natural gamma ray plot 1010, a depth plot 1012, a density plot 1014, a temperature plot 1016 and a caliper diameter plot 1018.

In the embodiment of FIG. 10, variations of caliper and respective density induced variations may have correspondence. For example, as seen by arrow 1020, at a depth of between 62 and 65 meters, the density change does not correspond with the natural gamma profile shown by plot 1010. Plot 1010 shows no natural gamma ray variation in the range. Specifically, at the depth shown by arrow 1020, the API of the natural gamma rays stays below 10 API. This therefore indicates no lithological change associated with the density variation.

However, the caliper diameter shows a significant increase in the borehole size near the area where the density significantly shifts and therefore the density change may be attributed to the change in the borehole diameter.

Figure 11:
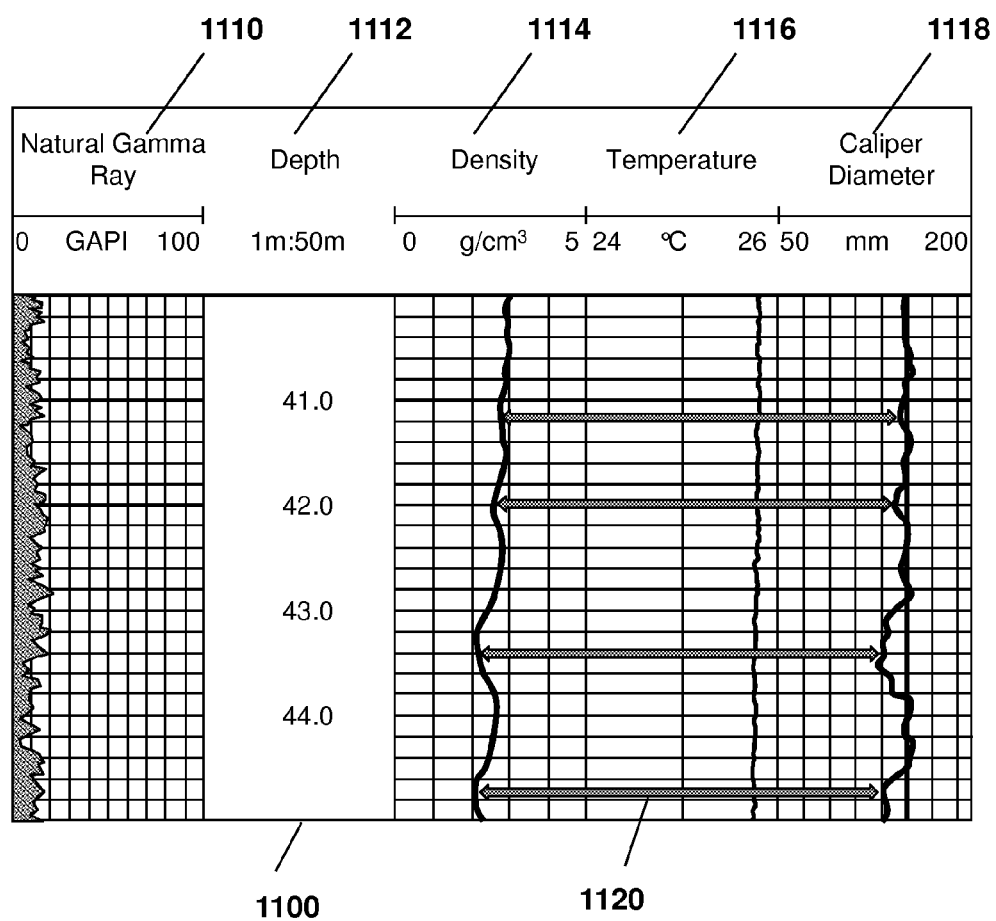
FIG. 11 is a graph showing changes in density in relation to a steady natural gamma count but in a borehole whose measured diameter is smaller than a nominal diameter.

Further, another possible correlation between the caliper diameter and the density is shown with regard to FIG. 11. In graph 1100 of FIG. 11, natural gamma rays are shown by plot 1110, depth is shown by plot 1112, density is shown by plot 1114, temperature is shown by plot 1116 and caliper diameter is shown by plot 1118.

The roughness or variation in the diameter of the borehole wall and the relation to density may be verified in the case where the rock allows a degree of blistering, presenting a decrease in the bore diameter relative to the drilling tool diameter in the passages of loose rock. This is shown, for example, by arrows 1120, which each show that the caliper diameter has a borehole size less than a base line borehole size at particular points. Such decreases in borehole size have corresponding variations in density, as shown in plot 1114.

The correspondence between the variation of caliper diameter and the density shown by the graph of FIG. 11 may be associated with the rock blistering or expanding in the borehole, and presenting a lower density value. Such effects are expected in less compact rock.

It is expected that more compact rock is present in a higher density and that the diameter in compact ranges is closer to the diameter of the drilling tool.

For the profile of FIG. 11, there is no variation in the natural gamma rays, which show that the natural gamma rays stay at a range of about 20 API. Because there is no variation in naturally occurring gamma rays, this indicates that there is likely no variation in the composition of the rock.

The logs of FIGS. 10 and 11, and specifically the natural gamma ray plots 1010 and 1110, present a low counting and certain regularity of natural gamma rays, providing variations that are below 30 API. Such plots indicate homogeneous or compact rock. Based on this observation, the conditions of the borehole walls cause variation in the density values.

One way to monitor the validity of a range whose conditions of the borehole walls are sufficiently preserved, and therefore has validity values for density, is the establishment of criteria of tolerance in the diameter of each point measured by the caliper tool.

Validation criteria may be established based on a variation of density associated with the internal diameter variation of borehole walls. For the purposes of quality control, such validation criteria establishes a maximum diameter variation entailing changes in the value of density within the established error in determining nominal densities for each lithology.

Alternatively, the validation criteria may establish the lowest variation between the nominal diameter and caliper measurements observed in the data set.

In a computational routine, the valid ranges of density with relation to the diameter of a hole based on caliper data may be established by comparing the nominal diameter of a hole to the caliper data. This is shown by FIG. 12.

Figure 12:
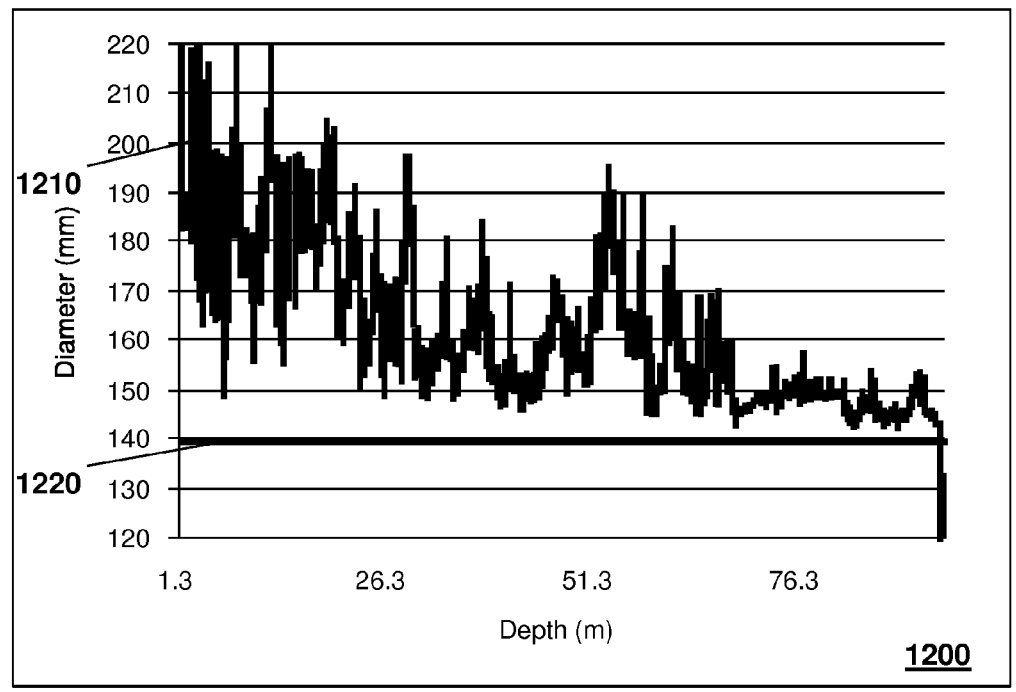
FIG. 12 is a plot of a hole diameter compared to nominal diameter for the depth of a borehole.

In particular, plot 1200 of FIG. 12 shows the caliper data 1210 in comparison with a nominal diameter of the hole, shown by line 1220. Predetermined criteria may be set to indicate the valid ranges of density based on actual diameter compared to nominal diameter of the borehole.

Verification of the Proportionality Between the Densities Measured by the Sensors of the Short and Long Spacing in the Probe by Means of Residual Analysis Due to mechanical factors such as borehole wall roughness, or geological factors, the linearity observed between density measurements of the sensors of the short and long spacing presents spread in the data set around the adjusted line.

Figure 13:
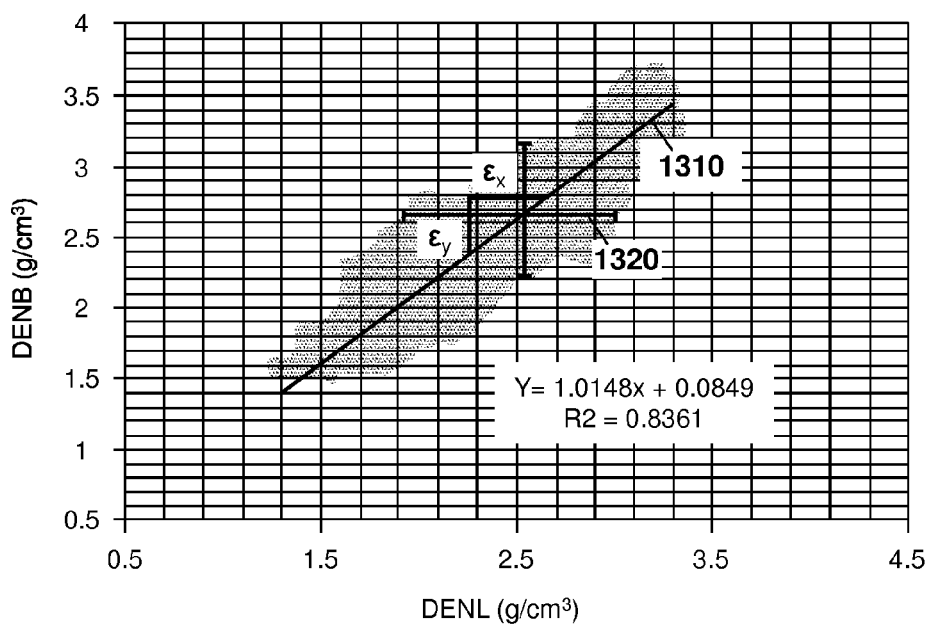
FIG. 13 is a plot of a dispersion with respect to an adjusted line DENB×DENL indicating degrees of freedom in which density measurements may vary.

Reference is now made to FIG. 13, which shows a plot 1300. As seen, the adjusted line 1310 includes an area around it which represents the data set. A degree of freedom in the dispersion cloud is shown with regard to reference 1320.

The behavior of FIG. 13 reflects the nonhomogeneous characteristic of the rocks and borehole wall diameters through which the sensors of different spacing indicate different densities for the same spot.

This phenomenon of FIG. 13 is explained further by the fact that, at some point, the stretch of rock covered by different sensors occasionally is different. That is, if the sensors are separated by a distance x, at the same time t, one of the sensors records the density of the rock in the depth z, and the other records the density at depth z+x. The difference of the density values with respect to the adjusted line can be decomposed into two components, one on the x-axis and one on the y-axis denoted by $\varepsilon_X$ and $\varepsilon_Y$, as shown in FIG. 13.

Considering a range of data in which $\varepsilon_Y \ll \varepsilon_X$, that is, the line tends to a horizontal-like behavior, linearity still may be preserved, changing only the slope of the line DENBxDENL which adjusts the data range. In this case, using quality control criteria, such a range would be considered valid, even if it is not formed from quality data.

If $\varepsilon_Y \ll \varepsilon_X$, this means that, at certain depths of the hole, only one sensor is recording data variations. Specifically, DENL is measuring the density variations and DENB presents fixed values over a given range.

In addition, a range with these characteristics may be hidden in the dispersion cloud of the data set around the adjusted line DENL×DENB of FIG. 13.

To identify and separate these ranges from other valid ranges, a proportionality is found between the sensors. Variations of punctual densities through the use of punctual measure of residuals along the borehole is given by relative differences between DENL and DENB according to equation 2 below.

$$\varepsilon = \sqrt{DENB^2 + DENL^2} \qquad (2)$$

In equation 2 above, DENL is the density measurement recorded in the long spacing sensor, and DENB is the measurement recorded in the short spacing sensor.

As a criterion for quality control, equation 2 is used for varying difference situations in measurements between the sensors, providing a tolerance of residuals, based on the error bars associated with the densities of each lithology.

Figure 14:
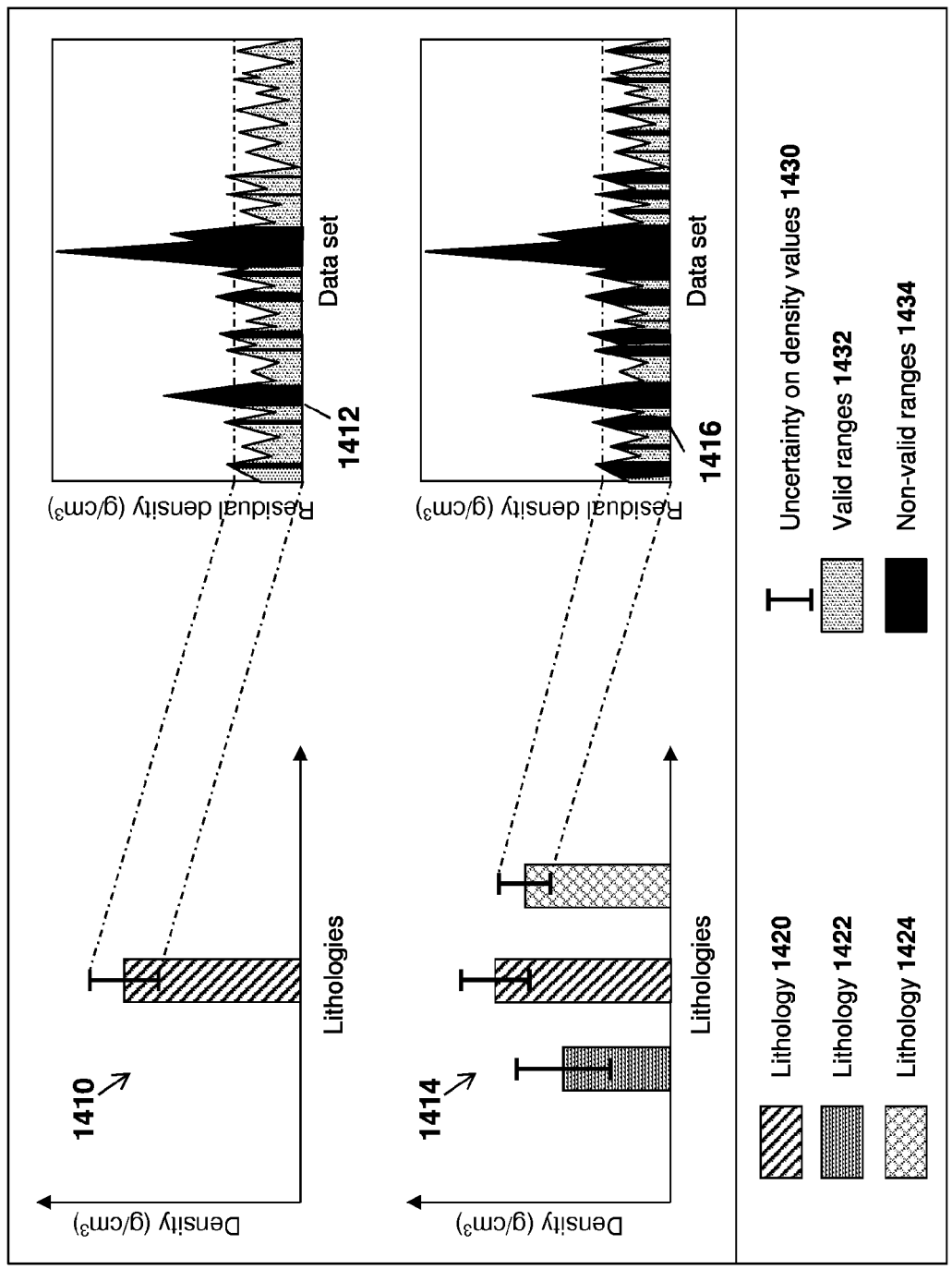
FIG. 14 is a plot showing range selection for a residual analysis in both the case of a single lithology and the case of multiple lithologies.

Specifically, one can consider that the tolerance for residuals is less than or equal to the error associated with only one lithology density measured punctually, or the smallest error in a data set that contains various lithologies as is expected for a borehole, as shown in FIG. 14.

In particular, as seen in FIG. 14, in a first plot 1410 a single lithology 1420 exists. In this case, by adopting the uncertainty of density values 1430 for the lithology 1420, a residual data set 1412 is provided. The residuals indicate a set of valid ranges 1432 which are limited by the uncertainty. Further, non-valid ranges 1434 are also shown by residual chart 1412.

With regard to plot 1414, three lithologies are provided and the uncertainty for all three lithologies can be then mapped into a residual data set 1416. As seen, uncertainties in lithologies 1420, 1422 and 1424 are therefore combined, producing a better data set since higher ranges of non-valid data 1434 are provided, ensuring that valid ranges 1432 provide more accurate detail.

From FIG. 14 it is expected that for a set of data without unilateral changes in a continuous range, the uncertainty and density value presents low values of residuals, indicating no disproportion variations between the sensors.

Figure 15:
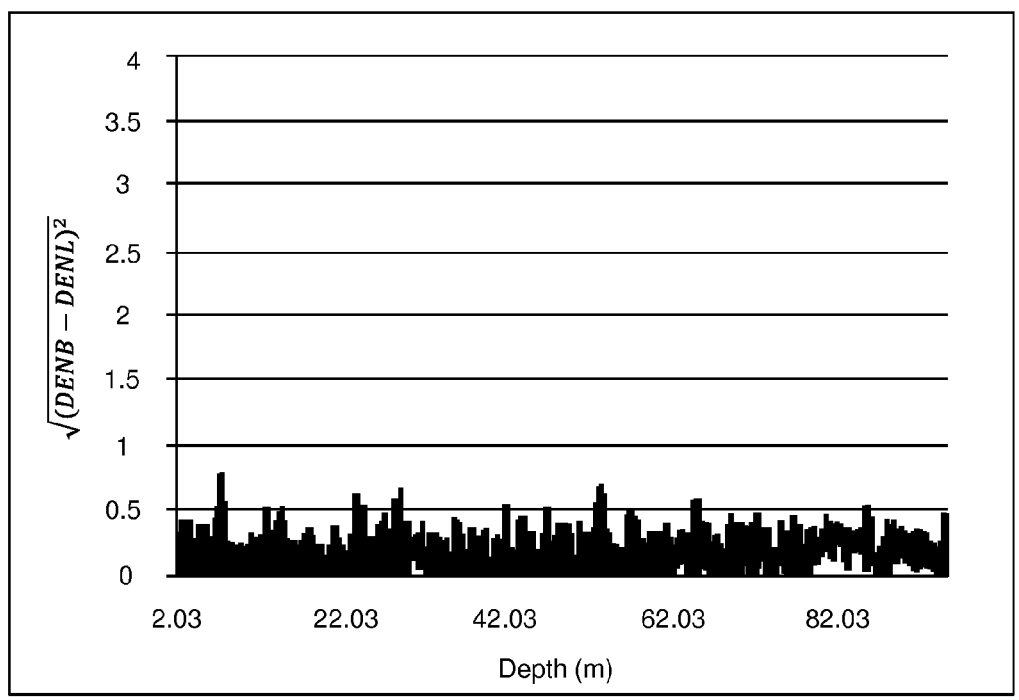
FIG. 15 is a plot showing residuals recorded for a range of depths.

For the set of data observed in the graph of FIG. 8, where one may observe dispersion around the adjusted DENL× DENB plot, the residuals present are shown in FIG. 15.

For example, the density values expected for iron ore formations vary between 3.2 g/cm³ to 4.1 g/cm³. Considering these values, the residuals observed in FIG. 15, consist of approximately 10% of maximum predicted density. Based on these residuals, one can establish a criterion of analysis per residuals as a step to quality control, setting a filter in the amount of 0.4 g/cm³ for the residual over the entire range. Such filter may be implemented on a computer.

Thus, in the example of FIG. 15, if the residuals are greater than the set value, even if there is linearity, there is no proportionality in the variation of density. That is, one sensor registers more variation in the range than the other. Such resulted may be filtered.

From the four criteria above, the control of basic data quality of gamma-gamma well logging applied to the exploitation of various minerals may include at least one of the four quality control techniques as identified above. Namely, these techniques include the verification of linearity between the density measurements recorded for the different sensors.

Further, the techniques include verification of the densities ranges for the entire dataset. The techniques further include the comparison between the internal diameter measurements of the boreholes compared with the nominal diameter. Finally, the verification may include a filter based on the proportionality in the variation of the density values based on residual analysis.

In one embodiment, a plurality of the steps may be superimposed, indicating at the end of the analysis both the valid depth ranges and the non-valid data for use in geological mapping.

Once the parameters are applied in one or more of the verification steps above, quality control may be automated by implementing the steps on a computer using an integrated computational algorithm. As described below, the results of the quality control may then be provided to a user of the system, either in graphical or numerical form.

Implementation

The above may be applied on any computer, including the data logging computer 250 from FIG. 2, as well as a remote computer. Further, in order to ensure the quality of the gamma-gamma well logging data used for mineral exploration, besides performing the four checks as proposed above, the present disclosure also provides for verification of data files of well logging. In other words, verification of the raw data may also be performed.

The gamma-gamma well logging data may be utilized in a standard format such as a .LAS format. Such standard refers to a Logging ASCII Standard. The data may, for example, consist of a header containing information about the hole, tools used and implementation of roll forming. However, variations are possible within the header file. However, the use of a .LAS file is merely an example, and other output formats are possible.

For the implementation of a quality control algorithm for gamma-gamma well logging data, various aspects of the header may be observed with respect to the input data. These include header formatting, the name of each data set and the name of dummy data, which consists of a preset symbolic value assigned to positions where there is no data. For example, in Table 1 below the dummy data shows a NULL value of −999.250.

Header information typically contains all information related to well logging and the constituent data of the file. For example, header information may be divided into four items, referred to herein as Version Information, Curve Information, Parameter Information and Other Information.

Table 1 below shows an example of Version Information.

TABLE 1

VERSION INFORMATION HEADER

| ~Version Information | | |
|---|---|---|
| VERB. | 2.00 | :CWLSLog ASCII Standard - Version 2.00 |
| WRAP. | NO | :One line per depth step # |
| ~Well Information | | |
| #MNEM.UNIT | DATA | :DESCRIPTION |
| #----.---- | ------------ | :-------------------- |
| STRT .M | 0.000 | :Start |
| STOP .M | 277.000 | :Stop |
| STEP .M | 0.010 | :Step increment |
| NULL. | −999.250 | :Null value |
| COMP. | VALE DO RIO DOCE | :Company |
| WELL . | ZAB-FD00001 | :Well |
| FLD . | ZABELINHA | :Field |
| PROV. | QUADRILATERO FERRIFERO | :Province/County |

TABLE 1-continued

| VERSION INFORMATION HEADER | | |
|---|---|---|
| CTRY . | MINAS GERAIS | :State/Country |
| LOC . | BRASIL | :Location |
| LOC2 . | | :Location 2 |
| SRVC. | Weatherford | :Service company |
| UWI. | | :Unique Well ID |
| LAT. | | :Latitude |
| LONG. | | :Longitude |
| DATE. | 16-May-2013 | :Logging date |

As seen in Table 1 above, the information provided includes information on the running of the geophysical well logging tools that produced the dataset. Among the information in this header item is the name of dummy data (NULL value), which should be identified and addressed in the quality control algorithm.

Referring to Table 2 below, this table provides Curve Information.

TABLE 2

| CURVE INFORMATION HEADER | | |
|---|---|---|
| ~Curve Information | | |
| #MNEM.UNIT | API CODES | :CURVE DESCRIPTION |
| #---.--- | --------- | :----------------- |
| DEPT .M | 00 001 00 00 | :Logged depth |
| CADE .MM | 45 280 01 00 | :Caliper from DD3 |
| BIT .MM | 70 282 00 00 | :Bit size |
| GRC1 .GAPI | 45 310 01 00 | :Gamma Ray from GC1-GC2 |
| DD3L .CPS | 00 000 00 00 | :Long Spaced Density Raw |
| DD3B .CPS | 00 000 00 00 | :Short Spaced Density Raw |
| DENL .G/C3 | 45 350 02 00 | :Density Long Spaced |
| DENB .G/C3 | 45 350 02 00 | :Density Short Spaced |
| GRDE .API | 45 310 01 00 | :Gamma Ray from DD3 |
| CCO1 .MM | 42 280 01 00 | :3-Arm Caliper CO1-GC2 |
| C01C .CPS | 00 000 00 00 | :Caliper Raw |
| DD3G .CPS | 00 000 00 00 | :Gamma Ray Raw |
| GC1G .CPS | 00 000 00 00 | :Gamma Ray Raw |
| DD3C .CPS | 00 000 00 00 | :Caliper Raw |
| GTMP .DEGC | 80 660 02 00 | :Borehole Temperature |

As seen in Table 2 above, the Curve Information brings the names of each data set used in the quality control algorithm, allowing each data set to be allocated for a specific function.

A third item in the header may be Parameter Information as seen by Table 3 below.

TABLE 3

| PARAMETER INFORMATION HEADER | | |
|---|---|---|
| ~Parameter Information | | |
| #MNEM.UNIT | VALUE | :DESCRIPTION |
| #---.--- | --------- | :----------- |
| RNID. | ZAB-FD00001 | :Run ID |
| EREF .M | | :Elevation of Depth Reference |
| DREF . | K.B. | :Depth reference |
| GL .M | | :Ground elevation |
| RUN . | 1 | :Run number |
| TDD .M | 332.450 | :TD (driller) |
| TDL .M | 277.000 | :TD (logger) |
| CSGD .M | 286.000 | :Casing bottom (driller) |
| CSGL .M | 277.000 | :Casing bottom (logger) |
| BS .MM | 77.80 | :Bit size |
| MUD . | | :Mud type |
| MUDD .K/M3 | | :Mud density |
| MUDV .CP | | :Mud viscosity |
| PH . | | :Mud pH |
| FL .ML/30MIN | | :Mud fluid loss rate |
| MUDS . | N/A | :Mud sample source |
| TMAX .DEGC | 21.04 | :Max recorder temperature |

TABLE 3-continued

| PARAMETER INFORMATION HEADER | | |
|---|---|---|
| TIMC .DAY/HR | | :Time circulation ended |
| TIML .DAY/HR | | :Time logger at bottom |
| UNIT . | 11608 | :Equipment ID |
| BASE . | | :Equipment base location |
| ENG . | | :Recording engineer |
| WIT. | | :Witnessed by |
| CSUP .FEET | -999999.000 | :Casing Stick UpGL |
| WLEV .METRES | 68.000 | :Water Level |

As seen in Table 3 above, Parameter Information contains information about the borehole, which can be used to identify data ranges compromised by the presence of water inside the hole which should be considered in the delivery of raw data, or within the algorithm of quality control depending on the number of holes filled with water in a campaign of geophysical well logging.

A fourth header portion may include Other Information as provided in Table 4 below.

TABLE 4

| OTHER INFORMATION HEADER |
|---|
| ~Other Information |
| TOOLS LOGGED IN CASED HOLE |
| GC2 TD @ 277.00 M |
| DD6 TD @ 277.00 M |
| CASED HOLE WITH HW- 00.00 M UNTIL 50.00 M |
| CASED HOLE WITH HQ- 00.00 M UNTIL 277.00 M |
| WATER LEVEL - 68 M |
| LOGGING JOB REQUESTED BY JOHN SMITH |

As seen in Table 4 above, the Other Information presents everything that does not apply within Tables 1 to 3. The additional information may be relevant to the processing or interpretation of data. For example, as seen in Table 4, the Other Information item specifies that well logging was performed inside casing, which should be considered in quality control so that cased hole data may be processed correctly.

In one embodiment, the formatting of the header may be observed and treated in the algorithm of quality control considering possible orders of which the information will be arranged, and providing a mechanism for information tracking.

A further aspect concerning the formatting refers to the separation of the input file into information destined for the quality control processing and that used for metadata. In particular, the present system allows for the processing to break the input file into its relevant components.

Figure 16:
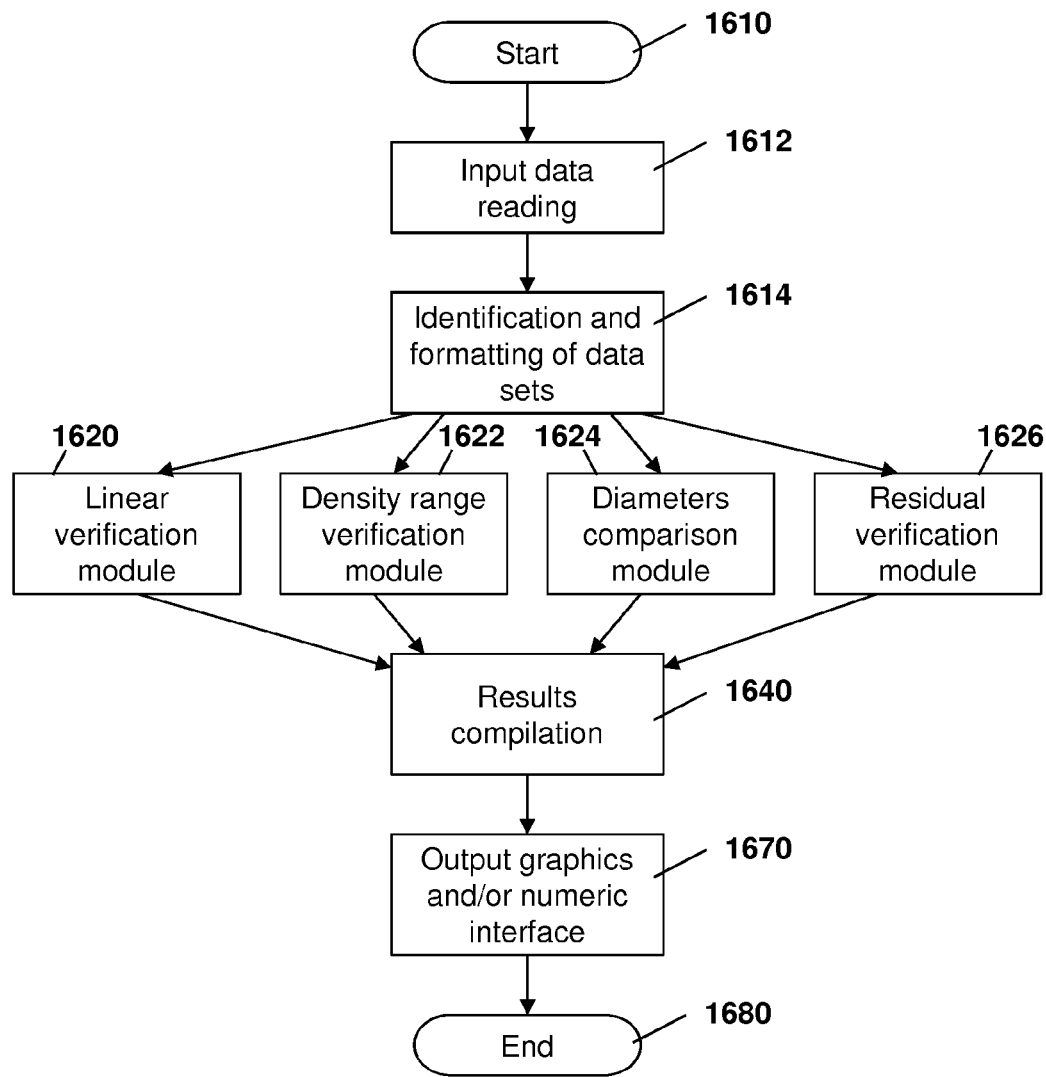
FIG. 16 is a flow chart showing a method in accordance with one embodiment of the present disclosure.

A method for quality control for gamma-gamma well logging data quality may include three basic stages. Reference is now made to FIG. 16.

FIG. 16 shows a process on a computing device for the determination of quality control information for well logging data. The process of FIG. 16 starts at block 1610 and proceeds to block 1612 in which data is input. For example, the data may be input from a .LAS file with a header provided with regard to the Tables 1 to 4 above.

From block 1612 the process proceeds to block 1614 in which the identification and formatting of data sets is identified.

Blocks 1612 and 1614 may thus provide a pre-processing stage characterized by the adaptation at the computing device to the input data format. The data may be separated into different data sets which are used by the different function units in the processing stage described below.

A data processing stage may then thereafter occur using various modules. For example, the example of FIG. 16 shows a linear verification module 1620, a density range verification module 1622, a diameter comparison module 1624 and a residual verification module 1626. As will be appreciated by those skilled in the art, a combination of these modules may be provided as a processing stage. The example of FIG. 16 shows all four modules. However, in other embodiments a subset of the modules may be utilized depending upon the requirements of the particular application.

Linear verification module 1620 calculates the linearity between the long and short sensors, as described above.

Density range verification module 1622 verifies that the density within the borehole logging is within a predetermined density range set for the depth of the borehole.

The diameter comparison module 1624 verifies the diameter as determined by a caliper against the density range as described above.

Residual verification module 1626 checks the residuals and determines whether or not the residuals are above a particular threshold as described with regard to the residual verification section above.

The processing in modules 1620, 1622, 1624 and 1626 may be done in any sequence or may be done in parallel, depending on the capabilities of the computing device performing the processing. Further, as indicated above, not all of modules 1620, 1622, 1624 or 1626 may be present in every embodiment, and if a module is omitted in a particular embodiment the processing associated with a missing module may be skipped.

Once the processing for modules 1620, 1622, 1624 and 1626 is complete, the process then proceeds to block 1640, which provides for results compilation in a results compilation stage. This consolidation block compiles the results of each processing module, completing the processing flow of the data related to the quality control. After results compilation, the process proceeds to block 1670 in which the compilation results are output. As seen in block 1670, the output may be graphical or numeric, for example.

From block 1670, the process proceeds to block 1680 and ends.

The implementation of the method illustrated in FIG. 16 shows a powerful root program. For reasons of adaptability and adjustments inherent in the development of computation routines, the method of FIG. 16 may be adapted to further include additional independent functions. The process may further be adapted to include the routine as a whole in a more comprehensive external process.

The method of FIG. 16 may be additionally or alternatively be implemented in stages, which allows specific tests for each function incorporated into the root program, as well as analysis of the integration of multi-function stages.

Considering the characteristic of multi-function distinct stages, the method of FIG. 16 may also include generation and addressing of intermediate input and output files, and associated computational costs, as a raw data file of gamma-gamma well logging may contain more than one million pieces of data.

As indicated by block 1670, the implementation of the computation routine may result in output. The output should be adapted to intended use of the data. Specifically, the backgrounds and needs of the users interpreting the processed data may be taken into account in the format in which the data is arranged for the easy use of the user in decision making.

For example, when gamma-gamma well logging data is used for geologic modeling, the data may be presented in numeric form, arranged as a spreadsheet data format. However, for purposes of quality control or for the wider view of the borehole, a graphic interface such as that shown with regard to FIG. 17 may be provided.

Figure 17:
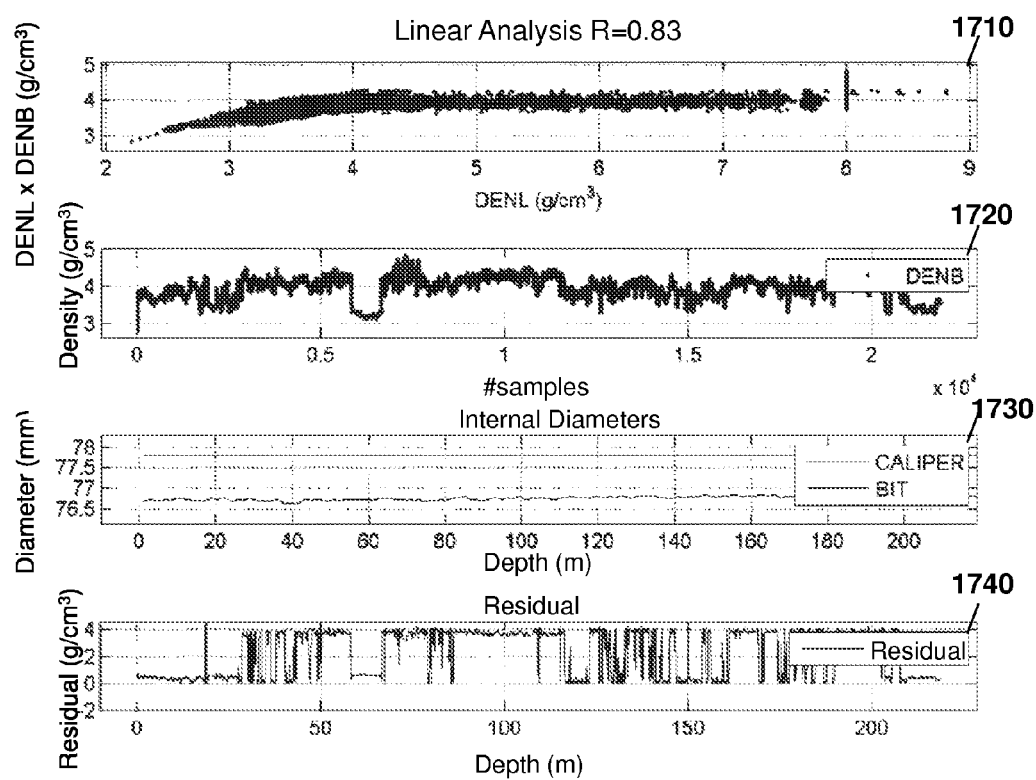
FIG. 17 is a plot showing data output of well logging, including verification of linearity, verification of the densities range read, a comparison between the diameters measured by a caliper tool and an analysis of residuals.

In particular, as seen in FIG. 17, a graphical representation of a linear analysis is presented by plot 1710, a verification of the densities range read is presented at plot 1720, a comparison between the diameters measured by the caliper tool and the borehole nominal diameter is provided at plot 1730, and an analysis of the residuals is provided at plot 1740.

Since the function of blocks 1620, 1622, 1624 and 1626 are independent of each other, it may be possible to make adjustment to generate hybrids and/or intermediate products for the data presented to a user for quality control purposes.

Based on the above, the data observed in the quality control of gamma-gamma well logging in boreholes is simply not present without the quality control methods described above. The observation of the raw data in the plots using a rolling logging is subject to sensitivity and the ability of a data interpreter.

Further, such data sets are large and may, in a borehole of a few hundred meters depth, produce more than a million data points. Thus, the quality control process as described above provides for between one and four aspects of quality for the data set including the linearity between measurements of different sensors, the range of densities, comparison of caliper tool measurements to nominal diameter and the proportionality between the measurement of different sensors.

The automation of the quality control to provide for data to an interpreter may be utilized to restrict omissions of data interpretation such as human factors and to minimize computation and time. Further, module computation routines facilitate changes in criteria, parameters or other factors to be considered in the quality control and the entire process may be adapted without significant functional implications both in isolation and in an integrated manner.

The basic quality control provided in the above disclosure does not exclude however detailed analysis of data. Such analysis may be characterized by well-defined parameter observation which can be compared with standard values.

The above therefore provides for a minimal set of observations to attest to the quality of gamma-gamma well logging after which data may be analyzed in its entirety by observing logs and indication of anomalous features or related to the behavior of the curve, as well as their implications to the interpretation of the data.

The computing device on which the methods described above is implemented may be any computing device. One example of a simplified computing device is provided with regards to FIG. 18.

Figure 18:
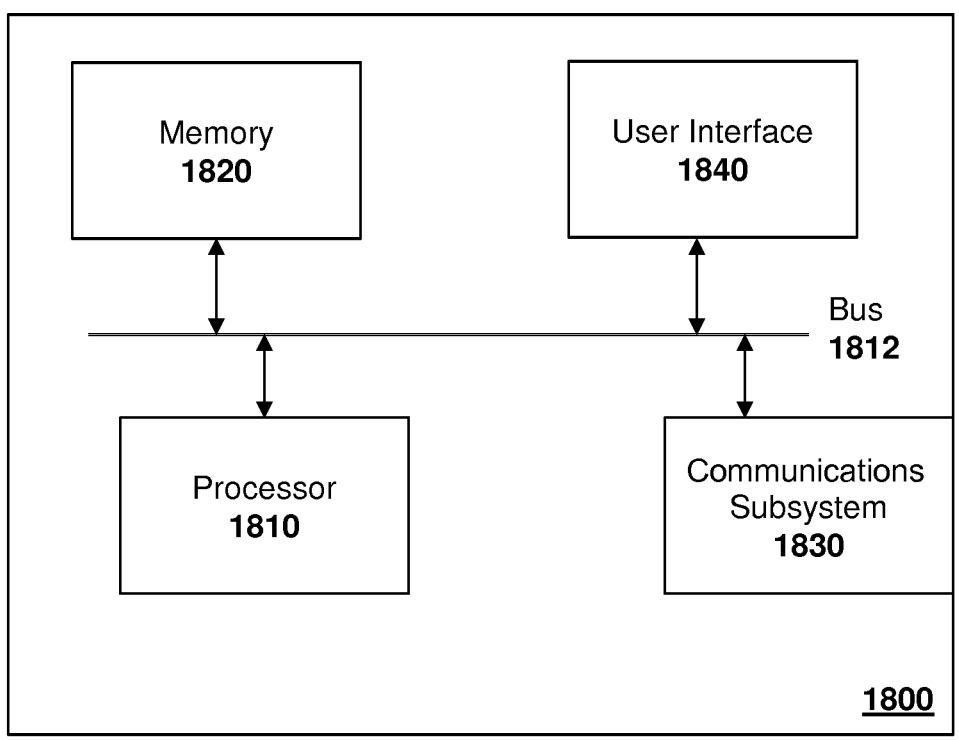
FIG. 18 is a block diagram of a simplified computing device capable of performing the methods of the present disclosure.

FIG. 18 is a block diagram of a computing device 1800 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The computing device 1800 may comprise a processor 1810 that interacts with a user interface 1840 having one or more input/output devices, such as a speaker, microphone, mouse, touchscreen, keypad, keyboard, printer, display, and the like.

The computing device may include one or more processors 1810, memory 1820, and communications subsystem 1830 connected to a bus 1812.

The bus 1812 may be one or more of any type of several bus architectures including a memory bus or memory controller, a peripheral bus, video bus, or the like. The processor 1810 may comprise any type of electronic data processor. The memory 1820 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The memory 1820 may further comprise any type of storage device configured to store data, programs, and other information and to make the data, programs, and other information accessible via the bus. Memory 1820 may comprise, for example, one or more of a solid state drive, hard disk drive, a magnetic disk drive, an optical disk drive, or the like.

The user interface 1840 may be used to couple external input and output devices to the processing unit. Examples of input and output devices include a display coupled to a video adapter, a mouse/keyboard/printer coupled to an I/O interface. Other devices may be coupled to the processing unit, and additional or fewer interface cards may be utilized. For example, a serial interface such as Universal Serial Bus (USB) (not shown) may be used to provide an interface for a printer, and an input may be provided for probe 200 data.

The computing device 1800 may also a communications subsystem 1830, which may comprise wired links, such as an Ethernet cable or the like, and/or wireless links to access nodes or different networks. Such communications subsystem 1830 would allow the computing device to communicate with remote units via the networks. For example, the communications subsystem 1830 may provide wireless communication via one or more transmitters/transmit antennas and one or more receivers/receive antennas. In an embodiment, the computing device 1800 is coupled to a local-area network or a wide-area network for data processing and communications with remote devices, such as other processing units, the Internet, remote storage facilities, or the like.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Additional features and advantages of the present disclosure will be appreciated by those skilled in the art.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

The invention claimed is:

1. A method of mineral exploration, comprising:
   receiving, at a computing device, raw well logging data from a gamma-gamma well logging probe within a borehole;
   identifying and formatting data sets from the raw well logging data;
   applying at least one quality control process to the formatted data sets, the at least one quality control process comprising one or more of:
      a linear verification process comparing linearity of density data readings between a long spaced sensor and a short spaced sensor of the gamma-gamma well logging probe;
      a density range verification process comparing density readings at the gamma-gamma well logging probe with density ranges for borehole lithology;
      a diameter comparison process comparing actual diameter of the borehole at a depth with density readings at the depth; and/or
      a residual verification process for verifying a proportionality between densities measured by the long spaced sensor and the short spaced sensor;
   adjusting at least a portion of the well logging data based on the at least one quality control process;
   compiling results of the at least one quality control process including the adjusted portion of the well logging data; and
   providing an output of the compiled results.

2. The method of claim 1, wherein the linear verification process comprises comparing the linearity of the density readings of the long spaced sensor and the short spaced sensor for the entire length of the borehole.

3. The method of claim 2, wherein the providing the output provides a chart comparing a combined density reading for the long spaced sensor and short spaced sensor with a density reading for one of the long spaced sensor and the short spaced sensor.

4. The method of claim 1, wherein the density range verification process comprises excluding data that falls outside of the borehole lithology density ranges.

5. The method of claim 4, wherein the at least one quality control process includes both the linear verification process and the density range verification process, wherein the excluding data is done prior to the linear verification process.

6. The method of claim 1, wherein the diameter comparison process comprises establishing a maximum diameter variation for the borehole.

7. The method of claim 1, wherein the diameter comparison process comprises establishing validity of density measurements at a depth based on whether an actual diameter of the borehole compared to a nominal diameter of the borehole at the depth is within a defined range.

8. The method of claim 7, wherein the output of the compiled results includes a graph of borehole diameter compared to nominal diameter for a depth of the borehole.

9. The method of claim 1, wherein the residual verification process comprises determining relative differences between density readings at the long spaced sensor and short spaced sensors.

10. The method of claim 9, wherein the relative differences are computed in accordance with $$\varepsilon = \sqrt{DENB^2 + DENL^2}$$

where $\varepsilon$ is the relative difference, DENB is the density reading at the short sensor and DENL is the density reading at the long sensor.

11. The method of claim 10, wherein the residual verification process further comprises establishing a threshold tolerance for residuals to provide a set of valid density ranges.

12. The method of claim 11, wherein the output comprises a chart of relative differences in residuals over a depth of the borehole.

13. The method of claim 1, wherein the at least one quality control process comprises all four of the linear verification process, the density range verification process; the diameter comparison process; and the residual verification process.

14. The method of claim 13, wherein the compiling the results comprises superimposing results of the four quality control processes to establish an indication of valid depth ranges and non-valid depth ranges.

15. The method of claim 1, wherein the receiving comprises obtaining a file in a standard logging format.

16. The method of claim 15, wherein the method further comprises confirming validity of the file.

17. The method of claim 15, wherein the identifying comprises parsing header information in the file.

18. The method of claim 1, wherein the output is in a numerical format.

19. The method of claim 1, wherein the output is provided to other computer processes for further processing.

20. A non-transitory computer readable medium for storing instructions which, when executed by a processor of a computing device, are configured to perform the method of claim 1.

21. The method of claim 1, further comprising generating a geological model based on the compiled results.

22. The method of claim 1, further comprising exploring for minerals based on the geological model.

* * * * *